United States Patent
Milke et al.

(10) Patent No.: US 11,676,743 B2
(45) Date of Patent: Jun. 13, 2023

(54) FILM RESISTOR AND THIN-FILM SENSOR WITH A PIEZORESISTIVE LAYER

(71) Applicant: TDK Electronics AG, Munich (DE)

(72) Inventors: Bettina Milke, Berlin (DE); Bernhard Ostrick, Teltow (DE)

(73) Assignee: TDK Electronics AG, Munich (DE)

( * ) Notice: Subject to any disclaimer, the term of this patent is extended or adjusted under 35 U.S.C. 154(b) by 280 days.

(21) Appl. No.: 16/624,716

(22) PCT Filed: Jun. 18, 2018

(86) PCT No.: PCT/EP2018/066099
§ 371 (c)(1),
(2) Date: Dec. 19, 2019

(87) PCT Pub. No.: WO2018/234233
PCT Pub. Date: Dec. 27, 2018

(65) Prior Publication Data
US 2020/0118719 A1   Apr. 16, 2020

(30) Foreign Application Priority Data

Jun. 19, 2017   (DE) ............... 10 2017 113 401.8

(51) Int. Cl.
| | |
|---|---|
| *G01L 1/18* | (2006.01) |
| *H01C 7/00* | (2006.01) |
| *G01L 9/00* | (2006.01) |
| *H01C 17/065* | (2006.01) |

(52) U.S. Cl.
CPC ............... *H01C 7/006* (2013.01); *G01L 1/18* (2013.01); *G01L 9/0055* (2013.01); *H01C 17/0652* (2013.01)

(58) Field of Classification Search
CPC .......... G01L 1/00; H01C 7/048; H01C 17/08; H01C 17/14; H01C 17/16; H01C 17/18; H01C 7/006; H01C 7/1013
See application file for complete search history.

(56) References Cited

U.S. PATENT DOCUMENTS

| | | |
|---|---|---|
| 3,451,030 A | 6/1969 | Garfinkel |
| 4,028,276 A | 6/1977 | Harden et al. |
| 4,057,777 A * | 11/1977 | Merz .................. H01B 1/16 252/512 |
| 4,076,652 A * | 2/1978 | Ganci .................. H01C 10/106 252/511 |

(Continued)

FOREIGN PATENT DOCUMENTS

| | | |
|---|---|---|
| DE | 2164206 A1 | 7/1973 |
| DE | 3918818 A1 | 12/1990 |

(Continued)

OTHER PUBLICATIONS

Kelly et al., "Deformation of Polycrystalline Transition Metal Carbides", Nov. 28, 1966, (Year: 1966).*

(Continued)

*Primary Examiner* — Tran M. Tran
(74) *Attorney, Agent, or Firm* — Slater Matsil, LLP

(57) ABSTRACT

A film resistor and a thin-film sensor are disclosed. In an embodiment a film resistor includes a piezoresistive layer including a first transition metal carbide.

16 Claims, 1 Drawing Sheet

(56) References Cited

U.S. PATENT DOCUMENTS

| | | | | | |
|---|---|---|---|---|---|
| 4,359,372 | A | * | 11/1982 | Nagai | H01C 7/041 |
| | | | | | 204/192.15 |
| 4,651,120 | A | * | 3/1987 | Aagard | G01L 9/0054 |
| | | | | | 29/25.35 |
| 4,657,699 | A | * | 4/1987 | Nair | H01C 17/0652 |
| | | | | | 252/514 |
| 4,894,635 | A | * | 1/1990 | Yajima | G01L 9/0055 |
| | | | | | 338/307 |
| 4,902,652 | A | * | 2/1990 | Kume | B01J 3/062 |
| | | | | | 204/192.15 |
| 4,994,781 | A | * | 2/1991 | Sahagen | G01L 9/0055 |
| | | | | | 338/42 |
| RE33,859 | E | * | 3/1992 | Gurol | H05K 3/28 |
| | | | | | 428/209 |
| 5,174,926 | A | * | 12/1992 | Sahagen | G01L 9/0055 |
| | | | | | 505/121 |
| 5,652,394 | A | * | 7/1997 | Sugino | G01L 1/125 |
| | | | | | 73/779 |
| 5,760,675 | A | * | 6/1998 | Lee | G01L 1/2293 |
| | | | | | 338/42 |
| 6,735,854 | B1 | * | 5/2004 | Golecki | G01P 15/0802 |
| | | | | | 29/609.1 |
| 6,981,410 | B2 | * | 1/2006 | Seki | G01F 1/6845 |
| | | | | | 73/204.26 |
| 6,989,574 | B2 | * | 1/2006 | Parsons | G01K 7/16 |
| | | | | | 374/E7.018 |
| 7,617,736 | B2 | * | 11/2009 | Tang | G01L 1/20 |
| | | | | | 73/777 |
| 8,284,012 | B2 | * | 10/2012 | Cole | H01C 17/0652 |
| | | | | | 338/22 R |
| 9,171,965 | B2 | * | 10/2015 | Takenaka | G01L 5/162 |
| 9,287,377 | B2 | * | 3/2016 | Glaser | H01L 29/456 |
| 9,835,511 | B2 | * | 12/2017 | Zhang | G01L 9/08 |
| 9,915,573 | B2 | * | 3/2018 | Prest | G01L 1/22 |
| 10,553,336 | B2 | * | 2/2020 | Leng | H01C 7/006 |
| 10,964,881 | B2 | * | 3/2021 | Elmegreen | H01L 49/00 |
| 2004/0079191 | A1 | * | 4/2004 | Kobayashi | C22C 29/08 |
| | | | | | 75/242 |
| 2005/0211214 | A1 | | 9/2005 | Tomita et al. | |
| 2009/0013801 | A1 | | 1/2009 | Yamashita et al. | |
| 2010/0308955 | A1 | | 12/2010 | Cole et al. | |
| 2010/0319900 | A1 | * | 12/2010 | Abyzov | C22C 26/00 |
| | | | | | 165/185 |
| 2013/0015537 | A1 | * | 1/2013 | Nowak | G01L 9/0054 |
| | | | | | 257/415 |
| 2015/0325345 | A1 | * | 11/2015 | Fujita | C23C 14/3414 |
| | | | | | 374/185 |
| 2016/0123828 | A1 | | 5/2016 | Matzen | |
| 2019/0265015 | A1 | * | 8/2019 | Michiwaki | G01L 1/22 |
| 2021/0272725 | A1 | * | 9/2021 | Fest | H01C 17/003 |

FOREIGN PATENT DOCUMENTS

| | | |
|---|---|---|
| DE | 69822770 T2 | 8/2004 |
| DE | 102009044980 A1 | 3/2011 |
| DE | 102015006057 A1 | 11/2016 |
| EP | 2620757 A1 | 7/2013 |
| JP | H10270201 A | 10/1998 |
| JP | 2013185966 A | 9/2013 |
| JP | 2015141167 A | 8/2015 |
| WO | 03040676 A1 | 5/2003 |
| WO | 2009129930 A1 | 10/2009 |

OTHER PUBLICATIONS

Wang et al., "Trend in crystal structure of layered ternary TAlC carbides", Oct. 2007, Journal of Materials Research (Year: 2007).*

Günter Schultes, et al, "Drucksensoren aus Zirkonoxid-Keramik mit hochempfindlichen Sensorschichten," Technisches Messen Band 83, Heft 3, ISSN (Online), 2196-7113US 2005, Nov. 4, 2014, pp. 147-156.

Antonov, M., et al.,"Chromium Carbide Based Cermets as the Wear Resistant Materials," 4th International Conference, Apr. 29-30, 2004, pp. 169-172.

Chung, G.S., "Micromachined chromium nitride thin-film pressure sensor for high temperature applications," Electronics Letters, Jun. 22, 2006, vol. 42, No. 13, pp. 1-2.

Rölke, J., "Nichrome Thin Film Technology and its Application," Electrocomponent Science and Technology, 1981, vol. 9, pp. 51-57.

Koppert, Ralf, et al., "Structural and physical properties of highly piezoresistive nickel containing hydrogenated carbon thin films," Diamond and Related Materials, Elsevier Science Publishers, Amsterdam, vol. 25, Jan. 26, 2012, pp. 50-58.

Phan, H.-P., et al., "The Piezoresistive Effect of SiC for MEMS Sensors at High Temperatures: A Review," Journal of Microelectromechanical Systems, 2015, vol. 24, Issue 6, pp. 1-15.

Pierson, H.O., "Applications of Refractory Carbides and Nitrides," Handbook of Refractory Carbides and Nitrides, Noyes Publications, Chapter 16, 1996, pp. 309-327.

* cited by examiner

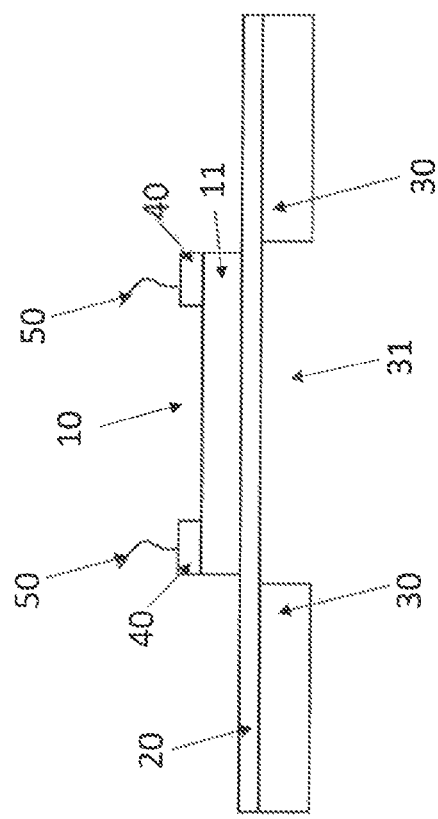

FILM RESISTOR AND THIN-FILM SENSOR WITH A PIEZORESISTIVE LAYER

This patent application is a national phase filing under section 371 of PCT/EP2018/066099, filed Jun. 18, 2018, which claims the priority of German patent application 102017113401.8, filed Jun. 19, 2017, each of which is incorporated herein by reference in its entirety.

TECHNICAL FIELD

The invention relates to a film resistor and a thin-film sensor which comprises the film resistor.

BACKGROUND

In thin-film sensors in which film resistors are applied to a membrane, the coefficients of thermal expansion of the individual components should be matched to one another in order to prevent stress during measurement.

Furthermore, a high sensitivity of the film resistor is advantageous for good measurement accuracy. The sensitivity can be indicated by the k factor (also known as "gage factor").

Finally, the mechanical stability is also relevant, especially in the case of cyclic bending stress as can occur, for example, in pressure sensors. A measure of the mechanical stability is the modulus of elasticity (E modulus).

SUMMARY OF THE INVENTION

Embodiments provide a film resistor having improved properties. Further embodiments provide a thin-film sensor comprising such a film resistor.

Embodiments provide a film resistor which comprises a piezoresistive layer, wherein the piezoresistive layer comprises a first transition metal carbide.

The piezoresistive layer can be configured, in particular, as thin film and have a thickness which corresponds to from 1 to 5 times the grain size of the transition metal carbide.

The piezoresistive layer is able to react to bending with resistance changes and thus makes strain, force and pressure measurements possible when it is used in a thin-film sensor.

Carbides of the transition metals, in particular of transition metal groups IV, V and VI, have a high robustness even at high temperatures, in particular temperatures of up to 300° C., and high pressures of up to 1000 bar. Owing to its mechanical stability, the piezoresistive layer and thus also the film resistor has a low E modulus, for example, an E modulus of ≤500 GPa.

Furthermore, the coefficients of expansion of transition metal carbides can be matched well to the coefficients of expansion of typical support materials or membrane materials as are used in thin-film sensors. Resistance changes in the piezoresistive layer, which are brought about by different coefficients of expansion of the piezoresistive layer and, for example, a membrane in a thin-film sensor, can be avoided in this way. Here, the coefficient of thermal expansion of the piezoresistive layer preferably corresponds to the coefficient of expansion of the membrane. Precisely matched coefficients of thermal expansion of the piezoresistive layer minimize the stress between the piezoresistive layer and the membrane, which leads to increased tolerance to external thermal stress and thus makes a higher long-term stability and a high measurement accuracy in a thin-film sensor possible. Irreversible changes of the layer and thus aging of the film resistor are in this way minimized by matched coefficients of thermal expansion and the life time of the film resistor is increased. Such a film resistor is therefore suitable for use in a thin-film sensor.

In one embodiment, the first transition metal carbide contains a transition metal selected from a group comprising Ti, V, Cr, Zr, Nb, Mo, Hf, Ta, W and combinations thereof. The transition metal carbide therefore contains a transition metal of transition metal groups IV, V and/or VI.

In one embodiment, the first transition metal carbide is chromium carbide $Cr_3C_2$. Chromium carbide $Cr_3C_2$ can be applied, for example, in a CVD (chemical vapor deposition) process or by means of thermal spray coating to form the piezoresistive layer and has very good corrosion and oxidation resistance. Chromium carbide is therefore well suited as material for the film resistor in a thin-film sensor, in particular also for use at high temperatures and pressures.

In one embodiment, the first transition metal carbide has an excess of transition metal. In general, the transition metal carbides do not have a precisely defined stoichiometry. However, the excess of metal can be expressed by the general formula $MC_x$, where M=Ti, V, Cr, Zr, Nb, Mo, Hf, Ta, W and combinations thereof and x is ≤1.

Transition metal nitrides which can be represented by $MN_x$ and in which M is a transition metal can have either an excess of metal (x<1) or a deficit of metal (x>1) in their composition. This leads to chemical instability and thus to deposition processes which are difficult to control. The instability is produced by both metal and nitrogen sites being vacant and being able to be occupied by other atoms.

In contrast thereto, deficits of metal, i.e. x>1, are uncommon in transition metal carbides. Transition metal carbides are therefore more chemically stable than transition metal nitrides. In transition metal carbides, substitutions with foreign atoms, for example, nitrogen or oxygen, are found only in interlattice sites of carbon. This is advantageous in the use as piezoresistive layer in a thin-film sensor since the electrical properties of the material depend on the ability to form solid solutions, i.e. mixed crystals, with other carbides or nitrides of the transition metals as a result of isomorphisms in the crystal lattice. For example, the grain growth of the ceramic is inhibited in the case of a combination of $Cr_3C_2$ and WC.

Owing to the high chemical stability of transition metal carbides, passivation of the piezoresistive layer by means of, for example, $Si_3N_4$ can thus be dispensed of in many uses of the film resistor.

In a further embodiment the piezoresistive layer consists of the transition metal carbide. For example, the piezoresistive layer consists of chromium carbide.

In a further embodiment, the piezoresistive layer comprises at least one additive material selected from among transition metal nitrides, second transition metal carbides and mixtures thereof. In this case, the first transition metal carbide can represent the main constituent of the piezoresistive layer. The additive material can be present in a proportion of up to 50% by mass. For example, the piezoresistive layer can contain predominantly $Cr_3C_2$ and additive materials in the form of nitrides or carbides of other transition metals. The metals M of the transition metal nitrides and second transition metal carbides can, for example, be selected from among Ti, V, Cr, Zr, Nb, Mo, Hf, Ta, W and combinations thereof.

In one embodiment, the additive material is tungsten carbide WC.

In one embodiment, the first transition metal carbide forms a mixed crystal with the additive material. Such a mixed crystal can, for example, have the formula $M(C_{1-}$ $_xN_x$), where M can again be selected from among Ti, V, Cr, Zr, Nb, Mo, Hf, Ta, W and combinations thereof. The formation of a mixed crystal makes it possible, for example, for the coefficient of thermal expansion of the piezoelectric layer to be matched to the membrane or the support to which it is applied in a thin-film sensor. Furthermore, the electrical and mechanical properties of the piezoelectric layer containing a mixed crystal can be adapted well to requirements in a thin-film sensor.

In one embodiment, the first transition metal carbide is polycrystalline. Thus, individual crystals of the first transition metal carbide or of the mixed crystal formed by the first transition metal carbide with an additive material are present in the piezoresistive layer.

In a further embodiment, the crystals of the first transition metal carbide have an oxide layer on their surface. If the first transition metal carbide forms a mixed crystal with an additive material, the crystals of the mixed crystal can also have an oxide layer on their surface. Transition metal carbides easily form stable surface oxides on the surface of their crystals or grains. An oxide layer on the surface of the crystals firstly protects the piezoresistive layer and secondly forms electrical grain boundary barriers between the conductive grains, which increase the resistance value and thus the piezoresistive effect of the layer.

In one embodiment, the piezoresistive layer has a coefficient of thermal expansion in the range from 9 ppm/K inclusive to 15 ppm/K inclusive. In particular, the coefficient of thermal expansion can be 10 ppm/K. A coefficient of expansion in this range, for example 10 ppm/K, is well matched to or corresponds to the coefficient of expansion of support or membrane materials, for example metals, which are customarily used in thin-film sensors and on which the film resistor is arranged.

In a further embodiment, the piezoresistive layer has a specific resistance of more than 70 μΩcm at a temperature of 20° C. The piezoresistive layer can in this way have a high sensitivity at room temperature.

Furthermore, the piezoresistive layer can have a k factor which is greater than 2. As a result, the piezoresistive layer has a high sensitivity.

In a further embodiment, the film resistor comprises electric contacts. In particular, the electric contacts can comprise the first transition metal carbide. Thus, the piezoresistive layer and the contacts can comprise the same first transition metal carbide as main constituent or consist thereof.

Further embodiments provide a thin-film sensor which comprises a film resistor. All features mentioned in respect of the film resistor may also apply in the case of the thin-film sensor and vice versa.

In one embodiment, the thin-film sensor comprises a membrane on which the film resistor is arranged and a support body to which the membrane is fastened. Here, the membrane is movable relative to the support body. In particular, the membrane is fastened to the support body in such a way that it can be bent or can oscillate relative to the support body. This means that the membrane can react to strain, force or pressure with bending movements, which leads to changes in resistance in the film resistor.

The membrane and the film resistor can be in direct mechanical contact with one another or further elements, for example an insulation layer, can be arranged between the membrane and the film resistor.

In one embodiment, the membrane and the support body comprise a material selected from among ceramic and metal. In this case, membrane and support body can comprise one of these materials independently of one another or they can form a body containing one of these materials.

In one embodiment, the membrane and the support body comprise a material selected from among stainless steel and yttrium-stabilized zirconium oxide (YSZ). Membrane and support body can thus both comprise stainless steel or YSZ. The coefficients of expansion of stainless steels and YSZ correspond particularly well to the coefficients of expansion which can be set in transition metal carbides, in particular also the coefficient of expansion of chromium carbide.

In a further embodiment, the thin-film sensor comprises at least two film resistors as described above. The film resistors can be connected to one another to form a bridge connection.

In a further embodiment, one of the film resistors can be configured for temperature measurement. The film resistor for temperature measurement can comprise the same first transition metal carbide as the other film resistor or resistors. Here, it can consist of or contain the first transition metal carbide.

The film resistor for temperature measurement can be arranged in a region of the support body or the membrane which experiences less deformation than other regions of the support body or the membrane.

BRIEF DESCRIPTION OF THE DRAWINGS

Particular embodiments of the invention will be illustrated in detail with the aid of the FIGURE and exemplary embodiments.

The sole FIGURE shows a schematic sectional view of a thin-film sensor as per one exemplary embodiment.

In the exemplary embodiments and FIGURES, identical, similar or similarly acting elements can in each case be denoted by the same reference numerals. The elements depicted and their relative sizes should not be considered to be true-to-scale; rather, individual elements can be depicted excessively large for better visibility and/or in the interests of better understanding.

DETAILED DESCRIPTION OF ILLUSTRATIVE EMBODIMENTS

The FIGURE shows a schematic sectional view of a thin-film sensor as per an exemplary embodiment. The support body 30 has an opening 31. Other shapes of the support body 30, which are not shown here, are likewise conceivable. For example, the support body 30 can be shaped so that the membrane 20 is fastened thereto only at one of its lateral margins.

A membrane 20 is applied to the support body 30 in such a way that it is freely movable relative to the support body 30 between the support body 30, within the opening 31.

In particular, the membrane 20 can be bent or can oscillate relative to the support body 30.

The film resistor 10 which contains the piezoresistive layer 11 is located on the membrane 20, especially in the region in which the membrane 20 is freely movable relative to the support body 30. At two opposite ends of the piezoresistive layer 11 there are electric contacts 40 which are electrically contacted via bond wires 50.

When the membrane 20 experiences a deformation, the piezoresistive layer 11 is also deformed, which due to the piezoresistive effect leads to a change in resistance, which can be detected by the contacts 40.

The thin-film sensor can also have a plurality of film resistors 10 (not shown here). For example, the thin-film sensor can have four film resistors. The film resistors 10 can be connected to form a measurement bridge by means of which, for example, a pressure can be measured. Forces on and strain of the membrane 20 can likewise be measured.

In this exemplary embodiment, the piezoresistive layer 11 contains $Cr_3C_2$ as main constituent. This can form mixed crystals with additive materials, for example other nitrides or carbides of the transition metals, in particular with WC. The contacts 40 likewise contain $Cr_3C_2$ as main constituent. The support body 30 and the membrane 20 consist of stainless steel or YSZ.

The piezoresistive layer and also the membrane 20 and the support body 30 have coefficients of expansion matched to one another, for example a coefficient of expansion of in each case 10 ppm/K. As a result, no stress arises between the membrane 20 and the film resistor 10 during the measurement, which stress could lead to drifts or destruction of the thin-film sensor.

The invention claimed is:

1. A film resistor comprising:
a piezoresistive layer comprising a first transition metal carbide as a main constituent and at least one additive material selected from the group consisting of transition metal nitrides, second transition metal carbides and mixtures thereof,
wherein the first transition metal carbide contains a transition metal selected from the group consisting of Ti, V, Cr, Zr, Nb, Mo, Hf, Ta, W and combinations thereof.

2. The film resistor according to claim 1, wherein the first transition metal carbide is Cr3C2.

3. The film resistor according to claim 1, wherein the first transition metal carbide is based on the formula $MC_x$, and wherein M=Ti, V, Cr, Zr, Nb, Mo, Hf, Ta, W and combinations thereof and x is 1.

4. A thin-film sensor comprising:
a first film resistor according to claim 1;
a membrane on which the first film resistor is arranged; and
a support body to which the membrane is fastened, the membrane being configured to be movable relative to the support body.

5. The thin-film sensor according to claim 4, wherein the membrane and the support body comprise a material selected from the group consisting of ceramic and metal.

6. The thin-film sensor according to claim 5, wherein the membrane and the support body comprise a material selected from the group consisting of stainless steel and yttrium-stabilized zirconium oxide.

7. The thin-film sensor according to claim 4, further comprising a second film resistor, wherein the second film resistor includes a piezoresistive layer comprising the first transition metal carbide.

8. The thin-film sensor according to claim 7, wherein one of the first or second film resistor is configured to measure temperature.

9. The film resistor according to claim 7, wherein the piezoresistive layer of the second film resistor comprises the at least one additive material selected from the group consisting of transition metal nitrides, second transition metal carbides and mixtures thereof.

10. The film resistor according to claim 1, wherein the additive material is tungsten carbide.

11. The film resistor according to claim 1, wherein the first transition metal carbide and the additive material form a mixed crystal.

12. The film resistor according to claim 1, wherein the first transition metal carbide is polycrystalline.

13. The film resistor according to claim 12, wherein crystals of the first transition metal carbide have an oxide layer on their surface.

14. The film resistor according to claim 1, wherein the piezoresistive layer has a coefficient of thermal expansion in a range from 9 ppm/K to 15 ppm/K inclusive.

15. The film resistor according to claim 1, further comprising electric contacts comprising the first transition metal carbide.

16. A film resistor comprising:
a piezoresistive layer comprising a first transition metal carbide as a main constituent and at least one additive material selected from the group consisting of transition metal nitrides, second transition metal carbides and mixtures thereof,
wherein the first transition metal carbide contains a transition metal selected from the group consisting of Ti, V, Cr, Zr, Nb, Mo, Hf, Ta, W and combinations thereof; and
electric contacts comprising the first transition metal carbide.

* * * * *

UNITED STATES PATENT AND TRADEMARK OFFICE
CERTIFICATE OF CORRECTION

PATENT NO. : 11,676,743 B2
APPLICATION NO. : 16/624716
DATED : June 13, 2023
INVENTOR(S) : Milke et al.

It is certified that error appears in the above-identified patent and that said Letters Patent is hereby corrected as shown below:

In the Claims

In Column 5, in Claim 2, Line 29, delete "Cr3C2." and insert -- $Cr_3C_2$. --, therefor.

In Column 5, in Claim 3, Line 33, delete "x is 1." and insert -- $x \leq 1$. --, therefor.

In Column 6, in Claim 9, Line 11, delete "film resistor" and insert -- thin-film sensor --, therefor.

Signed and Sealed this
Nineteenth Day of September, 2023

*Katherine Kelly Vidal*

Katherine Kelly Vidal
*Director of the United States Patent and Trademark Office*